(No Model.)
D. T. YOUNG.
HOOK AND LADDER TRUCK.
No. 315,690. Patented Apr. 14, 1885.
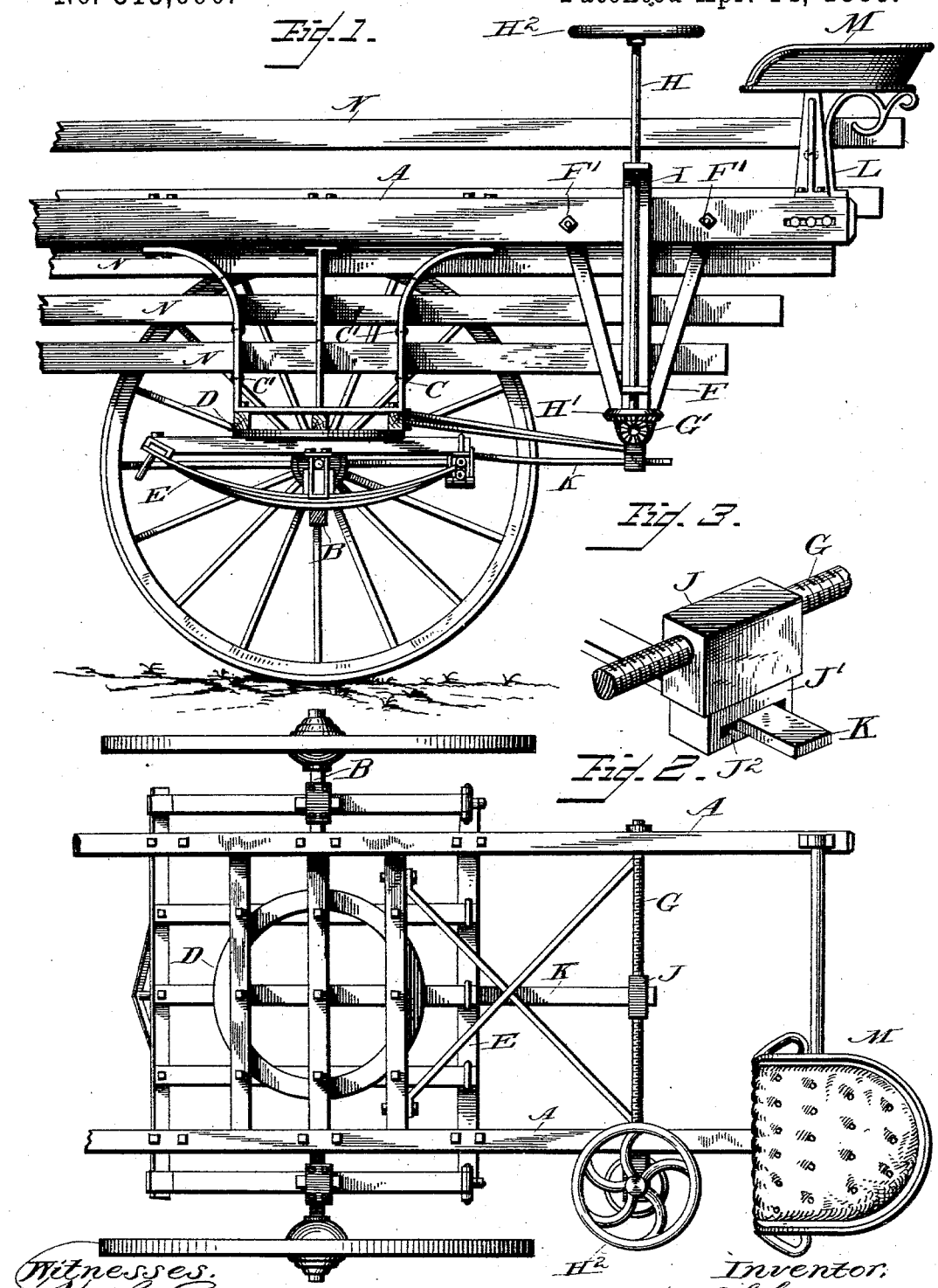

UNITED STATES PATENT OFFICE.

DAVID T. YOUNG, OF DAVENPORT, IOWA.

HOOK-AND-LADDER TRUCK.

SPECIFICATION forming part of Letters Patent No. 315,690, dated April 14, 1885.

Application filed March 12, 1885. (No model.)

*To all whom it may concern:*

Be it known that I, DAVID T. YOUNG, a citizen of the United States, residing at Davenport, in the county of Scott and State of Iowa, have invented certain new and useful Improvements in Steering Mechanism for Trucks, of which the following is a specification, reference being had to the accompanying drawings.

This invention has relation to steering mechanism for hook-and-ladder trucks and other vehicles where, by reason of their extreme length, it is necessary that a steering apparatus be employed for manipulating the hind axle which carries the rear wheels, in order that short turns may be made; and the invention consists in certain features of construction, hereinafter set forth, and specifically pointed out in the claims.

Referring to the drawings, Figure 1 is a side elevation of a hook-and-ladder truck (the front portion being broken away and a wheel thereof removed) provided with my improved steering mechanism. Fig. 2 is a plan of the same, and Fig. 3 a detail in perspective hereinafter referred to.

Like letters indicate like parts in all the figures.

It is a well-known fact among firemen and others skilled in fire-fighting appliances that the mechanism for controlling the rear wheels of a truck consists, in addition to other essential parts, of a rod or tiller, which extends up through a series of ladders, and is provided with a wheel or tiller-bar, whereby the rear axle is controlled by the tiller-man, and that considerable delay is occasioned when a truck arrives at a fire, by the fact that the wheel or tiller-bar has to be removed and the tiller-man dismount before ladders may be removed from the truck. It is also well known that the position of the tiller-man is rendered extremely dangerous, from the fact that very often, when running at a high rate of speed, the hind wheels strike such obstacles as ruts, rocks, and curbstones, which have a tendency to injure by a sudden shock, and sometimes even throw the tiller-man entirely from his seat to the ground below, by reason of the direct connection of the tiller-rod with said rear axle.

To obviate these and other minor objections, and to simplify the present construction and to render the truck as light as possible, is the object of my invention.

Referring more especially to Fig. 1 of the drawings, A represents the longitudinal side rails which form the base or frame-work of my truck, said frame being mounted upon a bent axle, B, by a metallic Y-brace, C, between which and the axle are interposed the usual fifth-wheel and spring, D E, respectively.

Extending from the Y-brace C on one side to the companion brace on the other are tie-bars, or it may be rollers, C', which form supports for the ladders N.

Depending from the under surface of the side rails, A, and preferably bolted thereto, as at F', and in rear of the hind axle and at each side thereof, is a hanger, F, provided with a bearing near its lower end for a screw-threaded shaft, G, which has rigidly secured at one end (preferably the left) a bevel-gear, G', said gear being adapted to mesh with a second gear of a larger diameter, H', which is rigidly secured to an upwardly-projecting tiller-rod, H, which is provided with a suitable tiller-bar or wheel, H², and is supported in a suitable bracket, I.

Upon the screw-threaded rod G is mounted a screw-threaded block or sleeve, J, as shown in detail in Fig. 3, and to a lower portion thereof, and formed integrally therewith, is a supplemental block, J'. The block or sleeve J' is longitudinally slotted nearly end to end, and passing freely through the same is a rigid bar, the other end bar of which is preferably secured to the rear end of the cross-spring E, or to the running-gear, in such a manner as to be rigid. It will thus be seen that by placing the controlling mechanism upon the side it is out of the way when ladders are to be removed therefrom, and it obviates the necessity of removing portions of said mechanism, as heretofore, for the purpose of removing ladders.

At the rear of the wheel or tiller H², and at the same side of the truck, I have arranged a seat, M, for the tiller-man, which is mounted upon suitable standards, L, which standards and seat are rigidly and permanently, or it may be adjustably, fixed to the side rails of the truck.

This being the construction, the operation is as follows: The controlling mechanism and the tiller-man being mounted at one side of the truck, as described, it will be seen that he has complete control of the axle and rear wheels by reason of the intermediate gearing hereinbefore described, and that by the simple turning of the wheel $H^2$ and tiller H, which carries the large pinion H', a rotary motion will be imparted to the screw-threaded rod G, and as it turns or rotates the sleeve J, carrying the rod K, will be moved along thereon in either direction, and the rod being rigidly secured to the running-gear below the fifth-wheel D thereof, or any other part, as may be desired, will cause the same—that is, the running-gear—to be turned, the rod or bar K sliding through the longitudinal aperture in the sleeve J; and it will also be seen that shocks given to the hind wheels by passing over or against obstructions will not be felt by the tiller-man, and that by reason of the tiller-rod carrying the larger gear or pinion a slight turn of said rod will cause the smaller pinion, which is rigid on the rod G, to turn rapidly, the block or sleeve being carried along to one side or the other, as desired, and the rod K sliding loosely through the longitudinal slot therein.

I do not limit my invention to the exact details of construction herein shown and described, as they may be varied in accordance with the judgment of persons skilled in the construction of similar apparatuses.

Having described my invention and its operation, what I claim, and desire to secure by Letters Patent, is—

1. In combination with the frame and rear truck of a vehicle of the class described, a transverse screw-threaded shaft, a nut or sleeve mounted thereon, a rod loosely mounted in said nut or sleeve and rigidly connected with the running-gear of the truck, and devices for rotating said screw-threaded shaft, substantially as specified.

2. In a ladder-truck, the combination, with the frame-work, of a seat and tiller-rod arranged at a side thereof, in combination with a transverse screw-threaded shaft, a sleeve mounted thereon, and a loosely-connected and rigid bar rigidly attached to the running-gear below the fifth-wheel thereof, substantially as specified.

3. In a ladder-truck, and in combination with the side rails thereof, brackets attached thereto mounted upon the fifth-wheel of the running-gear, and provided with ladder-supporting rollers, and a transverse screw-threaded shaft mounted in brackets in rear of the ladder-supporting brackets, and carrying a sleeve loosely connected with a rigid bar fastened to the running-gear below said fifth-wheel, substantially as specified.

4. The combination of the frame A, brackets C, provided with the ladder-supporting devices C', the fifth-wheel D, the axle B, and the running-gear mounted thereon, with the rod K, the sleeve J, slotted as at $J^2$, and the shaft G, pinions G' H', and tiller H $H^2$, substantially as shown and described.

5. The combination of the frame-work A, the transverse screw-threaded shaft G, having the pinion G', the bracket F, the sleeve J, and the rod K, connected with the lower part of the running-gear, substantially as shown and described.

6. The combination of the frame A, the seat M, arranged at one side thereof, the tiller arranged at the same side and in front of the seat, the transverse shaft G, having the beveled pinion G', meshing with the pinion, H', of the tiller-rod, a sleeve, J, and a rod, as K, rigidly secured to the running-gear, substantially as shown and described.

In testimony whereof I affix my signature in presence of two witnesses.

DAVID T. YOUNG.

Witnesses:
  EDWARD A. TAFT,
  GEORGE H. YOUNG.